United States Patent Office 2,879,270
Patented Mar. 24, 1959

2,879,270

3-OXO-3,4-DIHYDRO-1,4,2-BENZOTHIAZINE-2-ACETIC ACID HYDRAZIDES AND THEIR PREPARATION

Frederick K. Kirchner, Delmar, and Ernest J. Alexander, Rensselaer, N.Y., assignors to Sterling Drug Inc., New York, N.Y., a corporation of Delaware No Drawing. Application June 20, 1956
Serial No. 592,484

9 Claims. (Cl. 260—243)

This invention relates to new hydrazides and methods for the preparation thereof. In particular, the invention concerns novel arylhydrazides of 3-oxo-3,4-dihydro-1,4,2-benzothiazine-2-acetic acid.

Benzothiazines substituted in the 2-position by carboxymethyl and carboxyethyl groups are known. According to the present invention new and useful compounds are obtained when the 3-oxo-3,4-dihydro-1,4,2-benzothiazine-2-acetyl radical is attached through the carbonyl carbon atom to an arylhydrazine.

The compounds of the invention have the general formula

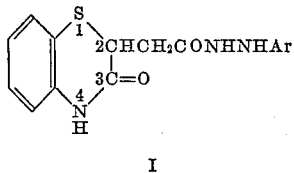

I wherein Ar is a monocarbocyclic aryl radical. The numbering system used is in accordance with the standard nomenclature used in the Ring Index and in Chemical Abstracts.

Hitherto, no compositions having the Formula I have been reported. Accordingly, it is the principal object of this invention to provide such compositions.

A further object of the invention is the obtention of new compounds having a surprisingly high activity as fungistatic and fungicidal agents.

Still another object of the invention is to provide new intermediates which are useful not only in preparing compounds of Formula I but as antibacterial agents.

In the above general Formula I the group Ar represents a monocarbocyclic aryl group, and therefore is a radical of the benzene series and can be an unsubstituted phenyl group or a phenyl group substituted by one or more substituents. A preferred class of monocarbocyclic aryl groups is phenyl and phenyl substituted by from one to three lower-alkyl, lower-alkoxy, nitro or halogen groups, and if two or more substituents are present they can be the same or different and in any of the various positions relative to one another. The lower-alkyl and lower-alkoxy groups preferably have from one to about four carbon atoms and thus include methyl, ethyl, propyl, isopropyl, butyl, isobutyl, and the like for lower-alkyl and methoxy, ethoxy, propoxy, isopropoxy, butoxy, isobutoxy, and the like for lower-alkoxy. The halogen substituents can be any of the four halogens, fluorine, chlorine, bromine or iodine.

Compounds of Formula I in which the phenyl ring is substituted by from one to three halogen atoms have especially high antifungal activity in vitro and as such constitute a particularly preferred aspect of the invention.

The componuds of the invention are prepared by reacting a maleic acid monophenylhydrazide with 2-aminobenzenethiol. The intermediate maleic acid monophenylhydrazides are prepared by reacting maleic anhydride with the appropriate phenylhydrazine.

The process is carried out by heating a maleic acid monophenylhydrazide with about one molar equivalent of 2-aminobenzenethiol at a temperature between about 50° C. and 150° C. The reaction can be carried out in any organic solvent miscible with and inert to the reactants but it is preferred to use pyridine.

Although the reaction proceeds at lower temperatures, the reaction is best carried out at a temperature between about 50° C. and 150° C. and if a solvent is selected that boils in this range, as is preferred, it is convenient to conduct the reaction at the reflux temperature of the solvent. Under these conditions, the reaction is immediate as evidenced by the immediate separation of water. It is not necessary to remove the water although it is preferred to separate it by azeotropic distillation.

The products are obtained as crystalline solids upon cooling the reaction mixture. The compounds are best obtained pure by recrystallization from a pyridine-water mixture.

The process for preparing the intermediate maleic acid monophenylhydrazides is carried out by reacting the appropriate phenylhydrazine with about one molar equivalent of maleic anhydride at a temperature between about 20° C. and 50° C. The reaction is preferably carried out in any inert organic solvent and for instance chloroform or diethyl ether can be used.

The reaction is exothermic and takes place at room temperature. After the reaction has taken place, the mixture can be warmed to about 50° C. to insure complete reaction. Although the reaction is essentially quantitative under these conditions, the use of temperatures higher than about 60° C. results in the formation of excessive amounts of by-product.

The compounds of Formula I can also be prepared from 3-oxo-3,4-dihydro-1,4,2-benzothiazine-2-acetic acid and the appropriate phenylhydrazine.

In this case, the process is carried out by reacting the acid with about a two molar equivalent of a sulfonyl halide followed by the addition of the appropriate phenylhydrazine. The sulfonyl halide can be an alkyl or arylsulfonyl halide wherein the halogen can be chlorine, bromine or iodine. Thus, the sulfonyl halide includes such compounds as methylsulfonyl bromide, n-butylsulfonyl chloride and the like for alkylsulfonyl halides and benzenesulfonyl iodide, p-toluenesulfonyl chloride and the like for arylsulfonyl halides. The reaction is carried out at a temperature between about 0° C. and 20° C. in the presence of a solvent such as pyridine. It is not necessary to isolate the intermediate and instead the reaction can be performed in a single operation. The product separates upon quenching in ice water and is recovered by suction filtration.

The structures of the compounds of the invention have been established by chemical analysis and the following series of reactions.

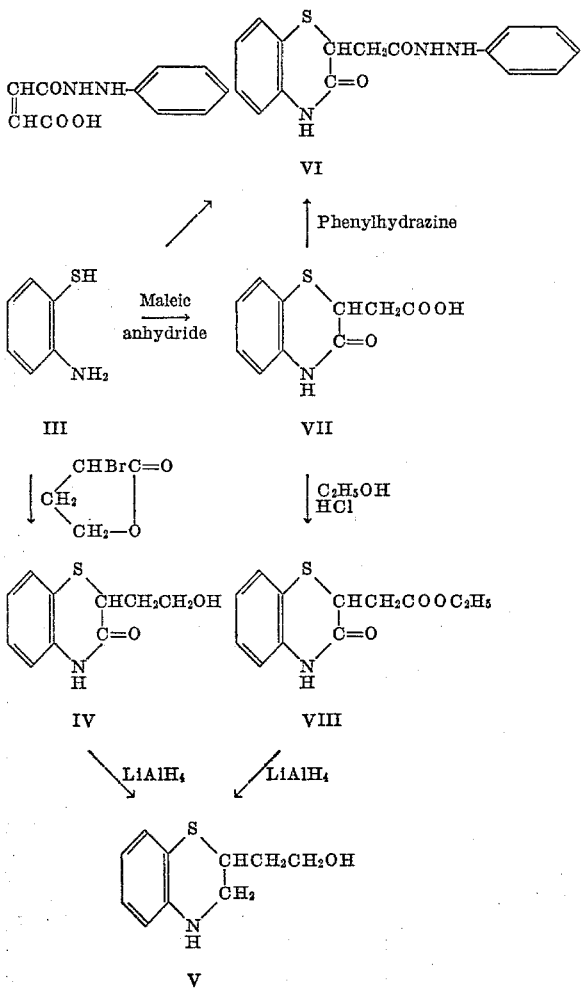

Thus, the structures of the hydrazides are as shown since the hydrazide obtained from 2-aminobenzenethiol and maleic acid monophenylhydrazide is identical with that obtained from 3-oxo-3,4-dihydro-1,4,2-benzothiazine-2-acetic acid, the structure of which is presumed known in the literature but which in any event has been established here by the sequences II–V and VII–V has been verified.

The following examples will further illustrate the invention, without the latter being limited thereto.

EXAMPLE 1

*3-oxo-3,4-dihydro-1,4,2-benzothiazine-2-acetphenylhydrazide*

(A) *From male-monophenylhydrazide.*—A suspension of 27 g. of male-monophenylhydrazide in 30 ml. of pyridine was mixed with 16.4 g. of 2-aminobenzenethiol and the mixture heated for fifteen minutes on a steam bath. The resultant solution was diluted with benzene and heated to reflux. As the water which separated immediately was removed by azeotropic distillation, a solid precipitated. The mixture was cooled and the crystals were collected by suction filtration, washed with benzene and dried at 75° C. After recrystallization from pyridine-water there was obtained 10 g. of 3-oxo-3,4-dihydro-1,4,2-benzothiazine-2-acetic acid and 7.1 g. of benzene-225° C. (corr.).

*Analysis.*—Calc'd for $C_{16}H_{15}N_3O_2S$: Nitrogen 13.41; sulfur 10.23. Found: Nitrogen 13.35; sulfur 9.84.

(B) *From 3-oxo-3,4-dihydro-1,4,2-benzothiazine-2-acetic acid.*—To a solution of 4.4 g. of 3-oxo-3,4-dihydro-1,4,2-benzothiazine-2-acetic acid and 7.1 g. of benzenesulfonyl chloride in 50 ml. of pyridine at 10° C. was added slowly 2.2 g. of phenylhydrazine. The solution was kept cold for one hour then poured into ice water. The solid which precipitated was collected by suction filtration and washed with water. Water was removed from the product by suspension in benzene followed by azeotropic distillation. After the solid was collected by suction filtration it was recrystallized from pyridine-water. The 3-oxo-3,4-dihydro-1,4,2-benzothiazine-2-acetphenylhydrazide thus obtained had the M.P. 225–226° C.

A mixed melting point with the material obtained using Procedure A showed no depression, establishing their identity.

The 3-oxo-3,4-dihydro-1,4,2-benzothiazine-2-acetphenylhydrazide was found to possess antifungal activity in vitro as follows:

| Organism | Maximum Effective Dilution | |
|---|---|---|
| | Fungistatic | Fungicidal |
| T. interdigitale | 1:20,000 | 1:13,000 |
| T. mentagrophytes | 1:20,000 | 1:13,000 |
| As. niger | 1:20,000 | 1:10,000 |
| T. gypseum | 1:13,000 | 1:10,000 |
| Monilia albicans | 1:13,000 | 1:10,000 |

EXAMPLE 2

*3-oxo-3,4-dihydro-1,4,2-benzothiazine-2-acet-(2,5-dichlorophenyl)-hydrazide*

PROCEDURE 1

(A) *Male-mono-(2,5-dichlorophenyl)hydrazide.*—To a solution of 4 g. of 2,5-dichlorophenylhydrazine in 50 M. of chloroform was added 2.2 g. of maleic anhydride in 25 ml. of chloroform. The mixture was warmed for one-half an hour during which time a solid separated. The suspension was cooled and the yellow crystals were collected by suction filtration, washed with chloroform and recrystallized from benzene-absolute alcohol. The 5 g. of male-mono-(2,5-dichlorophenyl)-hydrazide obtained had the M.P. 152.5–155.5° C. (corr.).

*Analysis.*—Calc'd for $C_{10}H_8Cl_2N_2O_3$: Nitrogen 10.18; chlorine 25.78. Found: Nitrogen 10.57; chlorine 25.91.

(B) 3-oxo-3,4-dihydro-1,4,2-benzothiazine-2-acet-(2,5-dichlorophenyl)hydrazide was obtained from the reaction of the above male-mono-(2,5-dichlorophenyl)hydrazide with 2-aminobenzenethiol using the manipulative procedure described above in Example 1A. The 3-oxo-3,4-dihydro-1,4,2-benzothiazine-2-acet-(2,5-dichlorophenyl)-hydrazide was obtained in 33% yield as a pale yellow solid, M.P. 266–267.5° C. (corr.).

*Analysis.*—Calc'd for $C_{16}H_{13}Cl_2N_3O_2S$: Chlorine 18.55; nitrogen 10.99. Found: Chlorine 18.76; nitrogen 10.84.

PROCEDURE 2

To a solution of 17 g. of 2,5-dichlorophenylhydrazine in 150 ml. of pyridine was added at room temperature 10 g. of maleic anhydride and the solution was allowed to stand for twenty minutes. To the deep red solution was added 12.5 g. of 2-aminobenzenethiol and the solution heated on a steam bath for forty-five minutes. Addition of 250 ml. of benzene caused the separation of a precipitate which was collected by suction filtration. After recrystallization from aqueous dioxane there was obtained 13 g. of 3-keto-3,4-dihydro-1,4,2-benzothiazine-2-acet(2,5-dichlorophenyl)hydrazide, M.P. 266–267.5° C. (corr.).

The 3-oxo-3,4-dihydro-1,4,2-benzothiazine-2-acet-(2,5- dichlorophenyl)hydrazide was found to possess antifungal activity in vitro as follows:

| Organism | Maximum Effective Dilution | |
|---|---|---|
| | Fungistatic | Fungicidal |
| T. interdigitale | 1:66,000 | 1:66,000 |
| T. mentagrophytes | 1:100,000 | 1:50,000 |
| As. niger | 1:66,000 | 1:50,000 |
| T. gypseum | 1:66,000 | 1:50,000 |
| Monilia albicans | 1:66,000 | 1:50,000 |

Following the manipulative procedures described in the above examples 3-oxo-3,4-dihydro-1,4,2-benzothiazine-2-(2-methylphenyl)hydrazide can be prepared by reacting male-mono-(2-methylphenyl)hydrazide, obtained from 2-methylphenylhydrazine and maleic anhydride, with 2-aminobenzenethiol; 3-oxo-3,4-dihydro - 1,4,2 - benzothiazine-2-(4-iodophenyl)hydrazide can be prepared by reacting male-mono-(4-iodophenyl)hydrazide, obtained by reacting 4-iodophenylhydrazine with maleic anhydride, with 2-aminobenzenethiol; 3-oxo-3,4-dihydro-1,4,2-benzothiazine-2-acet-(2-bromo-4-nitrophenyl)hydrazide can be prepared by reacting male-mono-(2-bromo-4-nitrophenyl)hydrazide, obtained by reacting 2-bromo-4-nitrophenylhydrazine with maleic anhydride, with 2-aminobenzenethiol and 3-oxo-3,4-dihydro-1,4,2-benzothiazine-2-acet-(4-butoxyphenyl)hydrazide can be prepared by reacting male - mono-(4-butoxyphenyl)hydrazide with 2-aminobenzenethiol; the intermediate male-mono-(4-butoxyphenyl)hydrazide can be prepared by reacting 4-butoxyphenylhydrazine, obtained by diazotization and reduction of 4-butoxyaniline, with maleic anhydride.

EXAMPLE 3

(A) Male-mono-(2,4-dichlorophenyl)hydrazide was prepared from 2,4-dichlorophenylhydrazine and maleic anhydride using the manipulative procedure described above in Example 2, Procedure 1A. The male-mono-(2,4-dichlorophenyl)hydrazide was obtained in 77% yield as a yellow solid, M.P. 165.5–166.5° C. (corr.).

Analysis.—Calc'd for $C_{10}H_8Cl_2N_2O_3$: Nitrogen 10.18; chlorine 25.78. Found: Nitrogen 10.47; chlorine 25.65.

The male-mono-(2,4-dichlorophenyl)hydrazide was found to possess antibacterial activity against *Staphylococcus aureus* and *Eberthella typhi* at maximum effective dilutions of 1:1000.

(B) 3-oxo-3,4-dihydro-1,4,2-benzothiazine-2-acet-(2,4-dichlorophenyl)hydrazide was prepared from male-mono-(2,4-dichlorophenyl)hydrazide and 2-aminobenzenethiol using the manipulative procedure described above in Example 1A. The 3-oxo-3,4-dihydro-1,4,2-benzothiazine-2-acet-(2,4-dichlorophenyl)hydrazide was obtained as a light yellow solid, M.P. 262–263° C. (corr.).

Analysis.—Calc'd for $C_{16}H_{13}Cl_2N_3O_2S$: Sulfur 8.39; chlorine 18.55. Found: Sulfur 8.74; chlorine 18.81.

EXAMPLE 4

(A) Male-mono-(3,4-dichlorophenyl)hydrazide was prepared from 3,4-dichlorophenylhydrazine and maleic anhydride using the manipulative procedure described in Example 2, Procedure 1A. The 3,4-dichlorophenylhydrazine, M.P. 73.5–75.0° C. was prepared by reduction of diazotized 3,4-dichloroaniline with stannous chloride. The male-mono-(3,4-dichlorophenyl)hydrazine was obtained in 75% yield as a yellow solid, M.P. 175–177° C. (corr.).

Analysis.—Calc'd for $C_{10}H_8Cl_2N_2O_3$: Nitrogen 10.18; chlorine 25.78. Found: Nitrogen 10.07; chlorine 25.59.

The male-mono-(3,4-dichlorophenyl)hydrazide was found to possess antibacterial activity against *Staphylococcus aureas* and *Eberthella typhi* at a maximum effective dilution of 1:10,000.

(B) *3-oxo-3,4-dihydro-1,4,2-benzothiazine-2-acet-(3,4-dichlorophenyl)hydrazide* was prepared from male-mono-(3,4-dichlorophenyl)hydrazide and 2-aminobenzenethiol using the manipulative procedure described in Example 1A. The 3-oxo-3,4-dihydro-1,4,2-benzothiazine-2-acet-(3,4-dichlorophenyl)hydrazide was obtained in 46% yield as a pink solid, M.P. 260–261.5° C. (corr.).

Analysis.—Calc'd for $C_{16}H_{13}Cl_2N_3O_2S$: Nitrogen 10.99; chlorine 18.55. Found: Nitrogen 10.96; chlorine 18.73.

EXAMPLE 5

(A) Male-mono-(2,3-dichlorophenyl)hydrazide was prepared from 2,3-dichlorophenylhydrazine and maleic anhydride using the manipulative procedure described above in Example 2, Procedure 1A. The 2,3-dichlorophenylhydrazine, M.P. 113.4–115.4° C. (corr.), was obtained by stannous chloride reduction of diazotized 2,3-dichloraniline. The male-mono-(2,3-dichlorophenyl)hydrazine was obtained in 79% yield as a yellow solid, M.P. 189.5–190.5° C. (corr.).

Analysis.—Calc'd for $C_{10}H_8Cl_2N_2O_3$: Nitrogen 10.18; chlorine 25.78. Found: Nitrogen 9.91; chlorine 25.72.

(B) 3-oxo-3,4-dihydro-1,4,2-benzothiazine-2-acet-(2,3-*dichlorophenyl*)*hydrazide* was prepared from male-mono-(2,3-dichlorophenyl)hydrazide and 2-aminobenzenethiol using the manipulative procedure described above in Example 1A. The 3-oxo-3,4-dihydro-1,4,2-benzothiazine-2-acet-(2,3-dichlorophenyl)hydrazide was obtained in 65% yield as a white solid, M.P. 264–265.5° C. (corr.).

Analysis.—Calc'd for $C_{16}H_{13}Cl_2N_3O_2S$: Nitrogen 10.99; chlorine 18.55. Found: Nitrogen 10.64; chlorine 18.42.

The 3-oxo-3,4-dihydro-1,4,2-benzothiazine-2-acet-(2,3-dichlorophenyl)hydrazide was found to possess antifungal activity in vitro as follows:

| Organism | Maximum Effective Dilution | |
|---|---|---|
| | Fungistatic | Fungicidal |
| T. mentagrophytes | 1:50,000 | 1:50,000 |
| As. niger | 1:50,000 | 1:50,000 |
| Monilia albicans | 1:50,000 | 1:50,000 |

EXAMPLE 6

(A) Male-mono-(4-bromophenyl)hydrazide was prepared from 4-bromophenylhydrazine and maleic anhydride using the manipulative procedure described above in Example 2, Procedure 1A. The male-mono-(4-bromophenyl)hydrazide was obtained in 80% yield as a yellow solid. The melting point was indefinite with melting starting at 164.5° C.

Anaylsis.—Calc'd for $C_{10}H_9BrN_2O_3$: Nitrogen 9.83; bromine 28.03. Found: Nitrogen 9.94; bromine 27.50.

(B) 3-oxo-3,4-dihydro-1,4,2-benzothiazine-2-acet-(4-bromophenyl)hydrazide was prepared from male-mono-(4-bromophenyl)hydrazide and maleic anhydride using the manipulative procedure described above in Example 2, Procedure 2. The 3-oxo-3,4-dihydro-1,4,2-benzothiazine-2-acet-(4-bromophenyl)hydrazide was obtained as a white solid, M.P. 230° C. (dec.) (corr.).

Anaylsis.—Calc'd for $C_{16}H_{14}BrN_3O_2S$: Nitrogen 10.71; sulfur 8.17. Found: Nitrogen 10.76; sulfur 7.98.

The 3-oxo-3,4-dihydro-1,4,2-benzothiazine-2-acet - (4-bromophenyl)hydrazide was found to possess antifungal activity in vitro as follows:

| Organism | Maximum Effective Dilution | |
|---|---|---|
| | Fungistatic | Fungicidal |
| T. interdigitale | 1:133,000 | 1:133,000 |
| T. mentagrophytes | 1:200,000 | 1:133,000 |
| As. niger | 1:100,000 | 1:100,000 |
| T. gypseum | 1:133,000 | 1:133,000 |
| Monilia albicans | 1:100,000 | 1:100,000 |
| P. ovale | 1:200,000 | 1:133,000 |

An ointment suitable for topical administration was prepared by incorporating 5 g. of 3-oxo-3,4-dihydro-1,4,2-benzothiazine-2-acet-(4-bromophenyl)hydrazide in a base of the following composition:

| | Grams |
|---|---|
| Stearic acid | 50.00 |
| Stearyl alcohol | 5.00 |
| Sodium borate | 5.00 |
| Glycerine | 50.00 |
| Carboxymethyl cellulose | 3.75 |
| Methyl p-hydroxybenzoate | 0.13 |
| Propyl p-hydroxybenzoate | 0.17 |
| Distilled water up to | 495.00 |

EXAMPLE 7

(A) Male-mono-(2,4,6-tribromophenyl)hydrazide was prepared from 2,4,6-tribromophenylhydrazine and maleic anhydride using the manipulative procedure described above in Example 2, Procedure 1A. The male-mono-(2,4,6-tribromophenyl)hydrazide was obtained as an off-white solid, M.P. 169.5–171° C. (corr.).

Analysis.—Calc'd for $C_{10}H_7Br_3N_2O_3$: Nitrogen 6.32; bromine 54.12. Found: Nitrogen 6.28; bromine 54.03.

(B) 3 - oxo - 3,4 - dihydro - 1,4,2 - benzothiazine-2 - acet - (2,4,6 - tribromophenyl)hydrazide was prepared from male - mono - (2,4,6 - tribromophenyl)hydrazide and 2-aminobenzenethiol by adding 2-aminobenzenethiol to a cooled solution of male-mono-(2,4,6-trichlorophenyl)-hydrazide in pyridine. After standing at room temperature for forty-five minutes, the solution was poured into benzene. The benzene solution was concentrated to about two-thirds its original volume then poured into n-pentane. The solid which formed was collected by suction filtration, washed with n-pentane and dried at 75° C. The 3 - oxo - 3,4 - dihydro - 1,4,2 - benzothiazine - 2 - acet - (2,4,6 - tribromophenyl)hydrazide thus obtained had the M.P. 253.5–254.5° C. (corr.), after recrystallization from pyridine-water.

Analysis.—Calc'd for $C_{16}H_{12}Br_3N_3O_2S$: Nitrogen 7.64; bromine 43.58. Found: Nitrogen 7.49; bromine 44.15.

Following the procedure described above 3 - oxo - 3,4-dihydro - 1,4,2 - benzothiazine - 2 - acet - (2,4 - dinitrophenyl)hydrazide can be prepared by reacting male-mono - (2,4 - dinitrophenyl) - hydrazide, obtained by reacting 2,4 - dinitrophenylhydrazine with maleic anhydride, with 2 - aminobenzenethiol; 3 - oxo - 3,4 - dihydro-1,4,2 - benzothiazine - 2 - acet - (3 - ethoxy - 4 - methylphenyl)hydrazide can be prepared by reacting male-mono - 3 - ethoxy - 4 - methylphenyl) - hydrazide, obtained by reacting 3 - ethoxy - 4 - methylphenylhydrazine with maleic anhydride, with 2 - aminobenzenethiol; 3-oxo - 3,4 - dihydro - 1,4,2 - benzothiazine - 2 - acet - (3-methyl - 6 - methoxyphenyl) - hydrazide can be prepared by reacting male - mono - (3 - methyl - 6 - methoxyphenyl)hydrazide, obtained by reacting 3 - methyl - 6-methoxy-phenylhydrazine with maleic anhydride, with 2-aminobenzenethiol; and 3 - oxo - 3,4 - dihydro - 1,4,2-benzothiazine - 2 - acet - (2,5 - dimethylphenyl)hydrazide can be prepared by reacting male-mono - 2,5 - dimethylphenyl)hydrazide, obtained by reacting 2,5 - dimethylphenyl-hydrazine with maleic anhydride, with 2-aminobenzenethiol.

EXAMPLE 8

(A) Male - mono - (4 - fluorophenyl)hydrazide was prepared from 4 - fluorophenylhydrazine and maleic anhydride using the manipulative procedure described above in Example 2, Procedure 1A. The male - mono - (4-fluorophenyl)hydrazide was obtained as a yellow solid, M.P. 155.5–156.5° C. (corr.).

Analysis.—Calc'd for $C_{10}H_9FN_2O_3$: Nitrogen 12.50; neut. equiv. 224. Found: Nitrogen 12.79; neut. equiv. 220.

The male - mono - (4 - fluorophenyl)hydrazide was found to possess antibacterial activity against Staphylococcus aureus and Eberthella typhi at a maximum dilution of 1:10,000.

(B) 3 - oxo - 3,4 - dihydro - 1,4,2 - benzothiazine - 2-acet - (4 - fluorophenyl) - hydrazide was prepared from male - mono - (4 - fluorophenyl) - hydrazide and 2-aminobenzenethiol using the manipulative procedure described above in Example 1A. The 3 - oxo - 3,4 - dihydro - 1,4,2 - benzothiazine - 2 - acet - (4 - fluorophenyl)hydrazide was obtained as an off-white solid, M.P. 225–227° C. (corr.).

Analysis.—Calc'd for $C_{16}H_{14}FN_3O_2S$: Nitrogen 12.68; sulfur 9.67. Found: Nitrogen 12.73; sulfur 10.02.

The 3 - oxo - 3,4 - dihydro - 1,4,2 - benzothiazine - 2-acet - (4 - fluorophenyl)hydrazide was also prepared using the manipulative procedure described above in Example 1B. A mixed melting point with the material obtained above showed no depression.

Using the procedures described in the above example 3 - oxo - 3,4 - dihydro - 1,4,2 - benzothiazine - 2 - acet-(2,4 - diiodophenyl)hydrazide can be prepared by reacting male - mono - (2,4 - diiodophenyl)hydrazide, obtained by reacting 2,4 - diiodophenylhydrazine with maleic anhydride, with 2 - aminobenzenethiol; 3 - oxo - 3,4 - dihydro - 1,4,2 - benzothiazine - 2 - acet - (3 - ter - butylphenyl)hydrazide can be prepared by reacting 3 - oxo-3,4 - dihydro - 1,4,2 - benzothiazine - 2 - acetic acid with p-toluenesulfonyl bromide and 3 - ter - butylphenylhydrazine; and 3 - oxo - 3,4 - dihydro - 1,4,2 - benzothiazine - 2 - acet - (4 - isopropylphenyl)hydrazide can be prepared by reacting 3 - oxo - 3,4 - dihydro - 1,4,2 - benzothiazine - 2 - acetic acid with methylsulfonyl iodide and 4-isopropylhydrazine.

EXAMPLE 9

(A) Male - mono - (4 - chlorophenyl)hydrazide was prepared from 4 - chlorophenylhydrazine and maleic anhydride using the manipulative procedure described above in Example 2, Procedure 1A. The male - mono - (4-chlorophenyl)hydrazide was obtained as a yellow solid, M.P. 162.5–165° C. (corr.).

Analysis.—Calc'd for $C_{10}H_9ClN_2O_3$: Nitrogen 11.64; chlorine 14.73. Found: Nitrogen 11.51; chlorine 14.54.

(B) 3 - oxo - 3,4 - dihydro - 1,4,2 - benzothiazine - 2-acet - (4 - chlorophenyl)hydrazide was prepared from male - mono - (4 - chlorophenyl)hydrazide and 2 - aminobenzenethiol using the manipulative procedure described in Example 2, Procedure 2. The 3 - oxo - 3,4 - dihydro-1,4,2 - benzothiazine - 2 - acet - (4 - chlorophenyl)hydrazide was obtained as a white solid, M.P. 235–237.5° C. (corr.).

Analysis.—Calc'd for $C_{16}H_{14}ClN_3O_2S$: Sulfur 9.22; chlorine 10.20. Found: Sulfur 8.90; chlorine 10.28.

EXAMPLE 10

(A) Male - mono - (2,4,6 - trichlorophenyl)hydrazide was prepared from 2,4,6 - trichlorophenylhydrazine and 2-aminobenzenethiol using the manipulative procedure described above in Example 2, Procedure 1A. The male-mono - (2,4,6 - trichlorophenyl)hydrazide was obtained as a white solid, M.P. 159.5–161° C. (corr.).

Analysis.—Calc'd for $C_{10}H_2Cl_3N_2O_3$: Nitrogen 9.05; chlorine 34.36. Found: Nitrogen 9.10; chlorine 34.12.

(B) 3 - oxo - 3,4 - dihydro - 1,4,2 - benzothiazine - 2-acet - (2,4,6 - trichlorophenyl)hydrazide was prepared from male - mono - (2,4,6 - trichlorophenyl)hydrazide and 2-aminobenzenethiol using the manipulative procedure described above in Example 7B. The 3 - oxo - 3,4-dihydro - 1,4,2 - benzothiazine - 2 - acet - (2,4,6 - trichlorophenyl)hydrazide was obtained as white crystals, M.P. 247.5–250.5° C. (corr.).

Analysis.—Calc'd for $C_{16}H_{12}Cl_3N_3O_2S$: Sulfur 7.69; chlorine 25.53. Found: Sulfur 7.59; chlorine 25.10.

The 3 - oxo - 3,4 - dihydro - 1,4,2 - benzothiazine - 2- acet - (2,4,6 - trichlorophenyl)hydrazide was found to possess antifungal activity in vitro as follows:

| Organism | Maximum Effective Dilution | |
|---|---|---|
| | Fungistatic | Fungicidal |
| T. interdigitale | 1:66,000 | 1:50,000 |
| T. mentagrophytes | 1:66,000 | 1:50,000 |
| As. niger | 1:50,000 | |
| T. gypseum | 1:66,000 | 1:50,000 |
| Monilia albicans | 1:66,000 | 1:66,000 |

According to the manipulative procedures described in the above examples 3 - oxo - 3,4 - dihydro - 1,4,2 - benzothiazine - 2 - acet - (4 - isobutylphenyl)hydrazide can be prepared by reacting 3 - oxo - 3,4 - dihydro - 1,4,2 - benzothiazine - 2 - acetic acid with benzenesulfonyl chloride and 4 - isobutylphenylhydrazine; 3 - oxo - 3,4 - dihydro - 1,4,2 - benzothiazine - 2 - acet - (3 - nitrophenyl)hydrazide can be prepared by reacting male - mono-(3 - nitrophenyl)hydrazide, obtained by reacting maleic anhydride with 3 - nitrophenylhydrazine, with 2 - aminobenzenethiol; 3 - oxo - 3,4 - dihydro - 1,4,2 - benzothiazine - 2 - acet - (3 - ethylphenyl)hydrazide can be prepared by reacting 3 - oxo - 3,4 - dihydro - 1,4,2 - benzothiazine with n-propylsulfonyl bromide and 3-ethylphenylhydrazine; 3 - oxo - 3,4 - dihydro - 1,4,2 - benzothiazine-2 - acet - (3,4 - dimethoxyphenyl)hydrazide can be prepared by reacting 3 - oxo - 3,4 - dihydro - 1,4,2 - benzothiazine - 2 - acetic acid with p-toluenesulfonyl chloride and 3,4 - dimethoxyphenylhydrazine; and 3 - oxo - 3,4-dihydro - 1,4,2 - benzothiazine - 2 - acet - (3 - methoxyphenyl)hydrazide can be prepared by reacting male-mono-(3-methoxyphenyl)hydrazide, prepared by reacting maleic anhydride with 3-methoxyphenylhydrazine, with 2-aminobenzenethiol.

EXAMPLE 11

*2-carbethoxymethyl-3-oxo-3,4-dimethyl-1,4,2-benzothiazine*

(A) *From diethyl maleate.*—In a three-necked flask fitted with an internal thermometer, Dean-Stark separator and a dropping funnel, was placed 51 g. of diethyl maleate. The flask was heated to 190° C. under an atmosphere of nitrogen and 37.5 g. of 2-aminobenzenethiol added dropwise. After collecting 14 ml. of ethyl alcohol, heating was discontinued and the mixture cooled. The solid that formed was dissolved in hot absolute ethyl alcohol, filtered by suction filtration and the filtrate diluted with n-pentane. The 2-carbethoxymethyl-3-oxo-3,4-dimethyl-1,4,2-benzothiazine, obtained on cooling had the M.P. 127–128° C. (corr.).

*Analysis.*—Calc'd for $C_{12}H_{13}NO_3S$: Nitrogen 5.57; sulfur 12.76. Found: Nitrogen 5.48; sulfur 12.51.

(B) *From 3 - oxo-3,4-dihydro-1,4,2-benzothiazine-2-acetic acid.*—A suspension of 4.5 g. of 3-oxo-3,4-dihydro-1,4,2-benzothiazine-2-acetic acid in 50 ml. of hydrogen chloride-saturated ethyl alcohol at 0° C. was warmed on a steam bath until solution was complete. The mixture was left standing for one hour then cooled. The white needles which formed were collected by suction filtration and dried. There was no depression of the melting point when the crystals were mixed with those obtained in Part A above.

EXAMPLE 12

*2-(2-hydroxyethyl)-3-oxo-3,4-dihydro-1,4,2-benzothiazine*

A solution of 16.5 g. of α-bromo-γ-butyrolactone in 25 ml. of absolute ethyl alcohol was treated with 12.5 g. of 2-aminobenzenethiol and the mixture heated on a steam bath for fifteen minutes. The solution was neutralized with sodium bicarbonate, diluted with water and allowed to stand for several days at room temperature. The solid which crystallized was collected by suction filtration and dried. After recrystallization from absolute ethyl alcohol there was obtained 9 g. of 2-(2-hydroxyethyl)-3-oxo-3,4-dihydro-1,4,2-benzothiazine, M.P. 105–106° C. (corr.).

*Analysis.*—Calc'd for $C_{10}H_{11}NO_2S$: Nitrogen 6.69; sulfur 15.32. Found: Nitrogen 6.63; sulfur 15.21.

EXAMPLE 13

*2-(2-hydroxyethyl)-3,4-dihydro-1,4,2-benzothiazine hydrochloride*

(A) *From 2-carbethoxymethyl-3-oxo-3,4-dihydro-1,4,2-benzothiazine.*—A suspension of 6.5 g. of lithium aluminum hydride in 600 ml. of anhydrous diethyl ether was treated with 25 g. of 2-carbethoxymethyl-3-oxo-3,4-dihydro-1,4,2-benzothiazine. After the addition was complete, the suspension was refluxed with stirring for three hours. The excess reagent and complex salts were decomposed with 20 ml. of ethyl alcohol, followed by 20 ml. of water and 2 ml. of glacial acetic acid. The mixture was filtered by suction and the ethereal filtrate dried over anhydrous magnesium sulfate. Addition of ethereal hydrogen chloride caused the separation of an oil which solidified on trituration with anhydrous ethyl ether. After recrystallization from absolute ethyl alcohol-absolute diethyl ether mixture there was obtained 12 g. of 2-(2-hydroxyethyl)-3,4-dihydro-1,4,2-benzothiazine, M.P. 145–148° C. (corr.).

*Analysis.*—Calc'd for $C_{10}H_{14}ClNOS$: Nitrogen 6.04; sulfur 13.83. Found: Nitrogen 6.02; sulfur 13.88.

(B) *From 2-(2-hydroxyethyl)-3-oxo-3,4-dihydro-1,4,2-benzothiazine.*—A suspension of 4 g. of 2-(2-hydroxyethyl)-3-oxo-3,4-dihydro-1,4,2-benzothiazine in 200 ml. of anhydrous diethyl ether was added to a suspension of 1 g. of lithium aluminum hydride in 300 ml. of anhydrous diethyl ether and the mixture refluxed with stirring for three hours. The excess reagent and complex salts were decomposed with 10 ml. of ethyl alcohol, 10 ml. of water and 1 ml. of glacial acetic acid and the insoluble material remaining removed by suction filtration. The filtrate was dried over anhydrous magnesium sulfate then treated with ethereal hydrogen chloride to precipitate the hydrochloride. Recrystallization from an absolute alcohol-absolute ether mixture gave 1.25 g. of product, M.P. 145–149° C. (uncorr.). There was no depression of the melting point when this material was mixed with the product obtained in Part A above, establishing the identity of the two products.

The 3-oxo-3,4-dihydro-1,4,2-benzothiazine-2-acetphenylhydrazides were found to have fungistatic and fungicidal activity in vitro when tested according to conventional serial dilution procedures against various fungi, for example, *Trichophyton interdigitale*, *Trichophyton mentagrophytes*, *Trichophyton gypseum*, *Aspergillus niger* and *Monilia albicans*.

The compositions are preferably administered topically; and they can be compounded with well-known extenders, binders or other excipients and administered in the form of a powder, liquid, ointment or salve or any other vehicular form suitable for administering antifungal agents. The 3-oxo-3,4-dihydro-1,4,2-benzothiazine-2-acetphenylhydrazides are preferably formulated in these various vehicular forms in dilutions of about 1:1000 to about 1:100,000.

We claim:

1. 3 - oxo - 3,4-dihydro-1,4,2-benzothiazine-2-acet-(4-bromo-phenyl)hydrazide.

2. 3 - oxo - 3,4-dihydro-1,4,2-benzothiazine-2-acet-(4-fluorophenyl)hydrazide.

3. 3 - oxo - 3,4-dihydro-1,4,2-benzothiazine-2-acet-(2,5-dichlorophenyl)hydrazide.

4. 3 - oxo - 3,4-dihydro-1,4,2-benzothiazine-2-acet-(2,4,6-trichlorophenyl)hydrazide.

5. 3 - oxo - 3,4-dihydro-1,4,2-benzothiazine-2-acet-(2,4,6-trichlorophenyl)hydrazide.

6. The process for preparing a compound having the formula

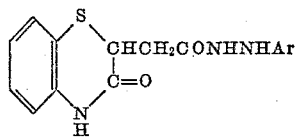

wherein Ar is a member of the class consisting of phenyl and phenyl substituted by from one to three groups selected from the class consisting of halogen, nitro, lower-alkyl and lower-alkoxy groups, which comprises heating a compound having the formula

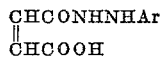

with 2-aminobenzenethiol in an inert solvent at a temperature between about 50° C. and 150° C.

7. The process for preparing a compound having the formula

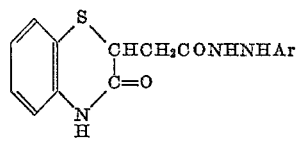

wherein Ar is a member of the class consisting of phenyl and phenyl substituted by from one to three groups selected from the class consisting of halogen, nitro, lower-alkyl and lower alkoxy groups, which comprises treating a compound having the formula ArNHNH$_2$ with 3-oxo-3,4-dihydro-1,4,2-benzothiazine-2-acetic acid in the presence of a sulfonyl halide wherein the halide is selected from the group consisting of chlorine, bromine and iodine.

8. 3 - oxo - 3,4-dihydro-1,4,2-benzothiazine-2-acetarylhydrazides wherein the aryl portion of the arylhydrazido radical is a member of the class consisting of phenyl and phenyl substituted by from one to three groups selected from the class consisting of halogen, nitro, lower-alkyl and lower-alkoxy groups.

9. 3 - oxo - 3,4 - dihydro-1,4,2-benzothiazine-2-acetphenylhydrazides wherein the phenyl radical is substituted by from one to three halogen atoms.

References Cited in the file of this patent

Mills et al.: J. Chem. Soc., 1927 (part 3), pages 2738–2752.

Chattaway et al.: J. Chem. Soc., vol. 121, pages 283–288 (1922).

Hotte: J. prakt. chemie, vol. 35 (2), pages 295–296 (1887).

UNITED STATES PATENT OFFICE
CERTIFICATE OF CORRECTION

Patent No. 2,879,270                                                       March 24, 1959

Frederick K. Kirchner et al.

It is hereby certified that error appears in the printed specification of the above numbered patent requiring correction and that the said Letters Patent should read as corrected below.

Column 2, line 7, for "componuds" read — compounds —; column 3, lines 23 to 27, the compound beside directional arrow from III to IV should be labelled — II —; column 3, line 74, for "-acetic acid and 7.1 g. of benzene-" read — -acetphenylhydrazide, m.p. 223- —; column 7, line 60, for "male-mono-2,5-" read — male-mono-(2,5- —; column 11, line 2, for "-trichlorophenyl)hydrazide" read — -tribromophenyl)hydrazide —; column 12, line 4, for "lower alkoxy" read — lower-alkoxy —.

Signed and sealed this 4th day of August 1959.

(SEAL)
Attest:

KARL H. AXLINE                                                           ROBERT C. WATSON

Attesting Officer                                                    Commissioner of Patents